US010068257B1

(12) United States Patent
Mosthaf (10) Patent No.: US 10,068,257 B1
(45) Date of Patent: Sep. 4, 2018

(54) PERSONALIZED GROUP RECOMMENDATIONS

(75) Inventor: Volker Helmut Mosthaf, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 950 days.

(21) Appl. No.: 13/216,135

(22) Filed: Aug. 23, 2011

(51) Int. Cl.
*G06Q 30/00* (2012.01)
*G06Q 30/02* (2012.01)

(52) U.S. Cl.
CPC ..... *G06Q 30/0269* (2013.01); *G06Q 30/0203* (2013.01); *G06Q 30/0207* (2013.01)

(58) Field of Classification Search
CPC .................................................. G06Q 30/0241
USPC .......................................................... 705/14
See application file for complete search history.

(56) References Cited

U.S. PATENT DOCUMENTS

| 5,758,257 | A | 5/1998 | Herz et al. |
| 6,041,311 | A | 3/2000 | Chislenko et al. |
| 6,317,722 | B1 | 11/2001 | Jacobi et al. |
| 6,408,437 | B1 | 6/2002 | Hendricks et al. |
| 6,460,036 | B1 | 10/2002 | Herz |
| 6,584,450 | B1 | 6/2003 | Hastings et al. |
| 6,609,106 | B1 | 8/2003 | Robertson |
| 6,611,814 | B1 | 8/2003 | Lee et al. |
| 6,925,444 | B1 | 8/2005 | McCollom et al. |
| 6,963,850 | B1 | 11/2005 | Bezos et al. |
| 7,222,085 | B2 | 5/2007 | Stack |
| 7,254,552 | B2 | 8/2007 | Bezos et al. |
| 7,305,436 | B2 | 12/2007 | Willis |
| 7,315,834 | B2 | 1/2008 | Martineau et al. |
| 7,319,975 | B2 | 1/2008 | Monteverde |
| 7,324,965 | B2 | 1/2008 | Martineau et al. |

(Continued)

FOREIGN PATENT DOCUMENTS

| EP | 0265083 A1 | 4/1988 |
| EP | 0751471 A1 | 1/1997 |

(Continued)

OTHER PUBLICATIONS

Jones, et al., "IndustryNet: A Model for Commerce on the World Wide Web," Carnegie Mellon University IEEE Expert, Oct. 1995.

(Continued)

*Primary Examiner* — Matthew L Hamilton
(74) *Attorney, Agent, or Firm* — Knobbe, Martens, Olson & Bear, LLP (57) ABSTRACT

A method and system for establishing a group of users and providing item recommendations tailored for the group are described. Users can join a recommendation huddle for the purpose of viewing collective item recommendations tailored for the users participating in the recommendation huddle. The item recommendations can be based on the recommendation profiles of participating users, the nature of the item recommendations to be provided (e.g., movies, restaurants, activities, songs, or the like), and other context information. Recommendations, including information about the recommended items, are provided to users participating in the recommendation huddle. In some embodiments, participating users can vote or otherwise provide feedback on the provided recommendations. One or more final selections can be made based on the recommendations and feedback.

22 Claims, 5 Drawing Sheets

(56) References Cited

U.S. PATENT DOCUMENTS

| | | |
|---|---|---|
| 7,346,668 B2 | 3/2008 | Willis |
| 7,356,490 B1 | 4/2008 | Jacobi et al. |
| 7,403,910 B1 | 7/2008 | Hastings et al. |
| 7,756,753 B1 | 7/2010 | McFarland et al. |
| 2002/0019763 A1 | 2/2002 | Linden et al. |
| 2002/0040389 A1 | 4/2002 | Gerba et al. |
| 2002/0198882 A1 | 12/2002 | Linden et al. |
| 2003/0163399 A1 | 8/2003 | Harper et al. |
| 2003/0177247 A1 | 9/2003 | Dunning et al. |
| 2004/0003096 A1 | 1/2004 | Willis |
| 2004/0003392 A1* | 1/2004 | Trajkovic et al. .............. 725/10 |
| 2004/0064640 A1 | 4/2004 | Dandrea et al. |
| 2004/0162783 A1 | 8/2004 | Gross |
| 2005/0038712 A1 | 2/2005 | Veeneman |
| 2005/0086127 A1 | 4/2005 | Hastings et al. |
| 2005/0091120 A1 | 4/2005 | Auletta |
| 2005/0125309 A1 | 6/2005 | Song |
| 2005/0222987 A1 | 10/2005 | Vadon |
| 2006/0020973 A1* | 1/2006 | Hannum et al. ................ 725/46 |
| 2006/0053449 A1 | 3/2006 | Gutta |
| 2006/0282304 A1 | 12/2006 | Bedard et al. |
| 2007/0061222 A1 | 3/2007 | Allocca et al. |
| 2007/0204287 A1* | 8/2007 | Conradt et al. ................ 725/28 |
| 2007/0260777 A1 | 11/2007 | Timpe et al. |
| 2008/0040239 A1 | 2/2008 | Jacobi et al. |
| 2008/0050714 A1* | 2/2008 | Avedissian .................... 434/350 |
| 2008/0134043 A1* | 6/2008 | Georgis et al. .............. 715/733 |
| 2008/0167946 A1 | 7/2008 | Bezos et al. |
| 2009/0150340 A1* | 6/2009 | Lhuillier et al. .................. 707/3 |
| 2009/0193015 A1* | 7/2009 | Jang et al. ......................... 707/5 |
| 2009/0319288 A1* | 12/2009 | Slaney et al. .................... 705/1 |
| 2010/0042460 A1* | 2/2010 | Kane, Jr. ............................ 705/9 |
| 2010/0064325 A1* | 3/2010 | Fishman et al. ................ 725/61 |
| 2010/0088649 A1* | 4/2010 | Kemp ............................ 715/845 |
| 2010/0169161 A1* | 7/2010 | Sacco ............................. 705/10 |
| 2011/0145040 A1* | 6/2011 | Zahn et al. .................. 705/7.33 |
| 2011/0238608 A1* | 9/2011 | Sathish ............................ 706/47 |
| 2011/0270774 A1* | 11/2011 | Varshaysky et al. ......... 705/319 |
| 2012/0180107 A1* | 7/2012 | Gammill et al. ................. 726/3 |
| 2013/0166564 A1* | 6/2013 | Su et al. ....................... 707/740 |

FOREIGN PATENT DOCUMENTS

| | | |
|---|---|---|
| EP | 0827063 A | 3/1998 |
| WO | 0205122 A2 | 1/2002 |

OTHER PUBLICATIONS

Hiraiwa, et al., "Info-Plaza: A Social Information Filtering System for the World-Wide Web," Institute for Social Information Science, Fujitsu Laboratories Ltd., 1-9-3 Nakase, Mihama-Ku, Chiba-shi, Chiba, 261 Japan IEEE, 1996.

Lin, et al., "Using customer knowledge in designing electronic catalog," Department of Industrial and Information Management, College of Management, National Cheng Kung University, No. 1, Ta-Hsueh Road, Tainan 701, Taiwan, ROC, 2006.

Nichols, et al., "Recommendation and Usage in the Digital Library," Lancaster University, Comuting Department, Cooperative Systems Engineering Group Technical Report Ref: CSEG/2/1997.

Web page titled "Gift Registry Service," printed from http://www.loystoys.com/loystoys/gift-registry.html on Aug. 15, 2006.

"Just Add People—Collaborative filtering brings human input to information retrieval in the enterprise," Information Week, p. 65, published on Dec. 22, 1997.

U.S. Appl. No. 09/933,277, filed Aug. 20, 2001 (filing receipt, application text, and drawings provided).

U.S. Appl. No. 11/09,3507, filed Mar. 30, 2005 (filing receipt, application text, and drawings provided).

U.S. Appl. No. 09/852,124, filed May 8, 2001 (filing receipt, application text, and drawings provided).

Foursquare, accessed from http://foursquare.com/about, last accessed on Jul. 25, 2011.

Unknown author, "Gifted Solutions Announces the General Release of its New, Fully Integrated E-Commerce Gift Services Engine," Business Wire, Dec. 3 1999.

Connotea. "Connotea: Guide" [online], [retrieved on Sep. 22, 2010]. Retrieved from the Internet: <URL:http://web.archive.org/web/20050305025653/www.connotea.org/guide>, 4 pages).

\* cited by examiner

PERSONALIZED GROUP RECOMMENDATIONS

BACKGROUND

A variety of methods are known for detecting behavior-based associations (associations based on user behaviors) between items stored or represented in a database. For example, the purchase histories or item viewing histories of users can be analyzed to detect behavior-based associations between particular items represented in an electronic catalog (e.g., items A and B are related because a relatively large number of those who purchased A also purchased B). As another example, the web browsing histories of users can be analyzed to identify behavior-based associations between particular web sites and/or web pages.

The detected behavior-based associations are typically used to assist users in locating items of interest. For example, in the context of an electronic catalog, when a user accesses a network resource, such as a web page, that is associated with an item, the resource may be supplemented with a list of related items. The detected associations may also be used to generate personalized recommendations that are based on the target user's purchase history, item viewing history, and/or other item selections.

BRIEF DESCRIPTION OF THE DRAWINGS

Throughout the drawings, reference numbers are re-used to indicate correspondence between referenced elements. The drawings are provided to illustrate embodiments of the inventions described herein and not to limit the scope thereof.

DETAILED DESCRIPTION

Various systems and techniques for providing item recommendations to a particular user are known in the art. Such systems can, for example, be used to provide recommendations for music, movie titles, or products in an online catalog. In some situations, however, a group of users may choose collectively one or more items for the group as a whole. In such situations, separate recommendations provided for each user may not reflect the preferences of the group as a whole, and manually isolating common interests or preferences may be difficult. Further, a user's selection tendencies, including the user's willingness to deviate from known or predicted preferences as well as the user's affinity for certain items or classes of items, can change depending on group context information. For example, such tendencies can depend on the identities or characteristics of other users in the group, the nature or purpose of the group, the type of activity, location information, or time information.

This disclosure presents a novel method and system for establishing a group of users and providing recommendations tailored for the group. Users can join a recommendation huddle for the purpose of viewing collective recommendations tailored for the users participating in the recommendation huddle. The recommendations can be based on the recommendation profiles of participating users, the nature of the recommendations to be provided (e.g., movies, restaurants, activities, songs, or the like), or other context information. Recommendations, including information about the recommended items, are provided to users participating in the recommendation huddle. In some embodiments, participating users can vote or otherwise provide feedback on the provided recommendations. One or more final selections can be made based on the recommendations and feedback.

For purposes of illustration, the systems and processes disclosed herein are described primarily in the context of an interactive computer system that provides users with access to, and recommendations from, a catalog of items on an e-commerce web site. As will be apparent, however, the disclosed systems and processes may also be used in other types of systems, and can be used to recommend other types of items, such as but not limited to web sites, news articles, blogs, podcasts, travel destinations, service providers, other users (e.g., as potential friends in a social network), events, discussion boards, photos and other images, online videos, tagged items, advertisements, and user-generated lists of items. In addition, the disclosed systems and processes need not be implemented as part of, or in conjunction with, a web site.

The term "item" is used interchangeably herein to refer to an item itself (e.g., a particular product, service, bundle of products or services or any combination thereof) and to its description or representation in a computer system. As will be apparent from the context in which it is used, the term is also sometimes used herein to refer only to the item itself or only to its representation in the computer system.

Overview of an Example Embodiment

Figure 1:
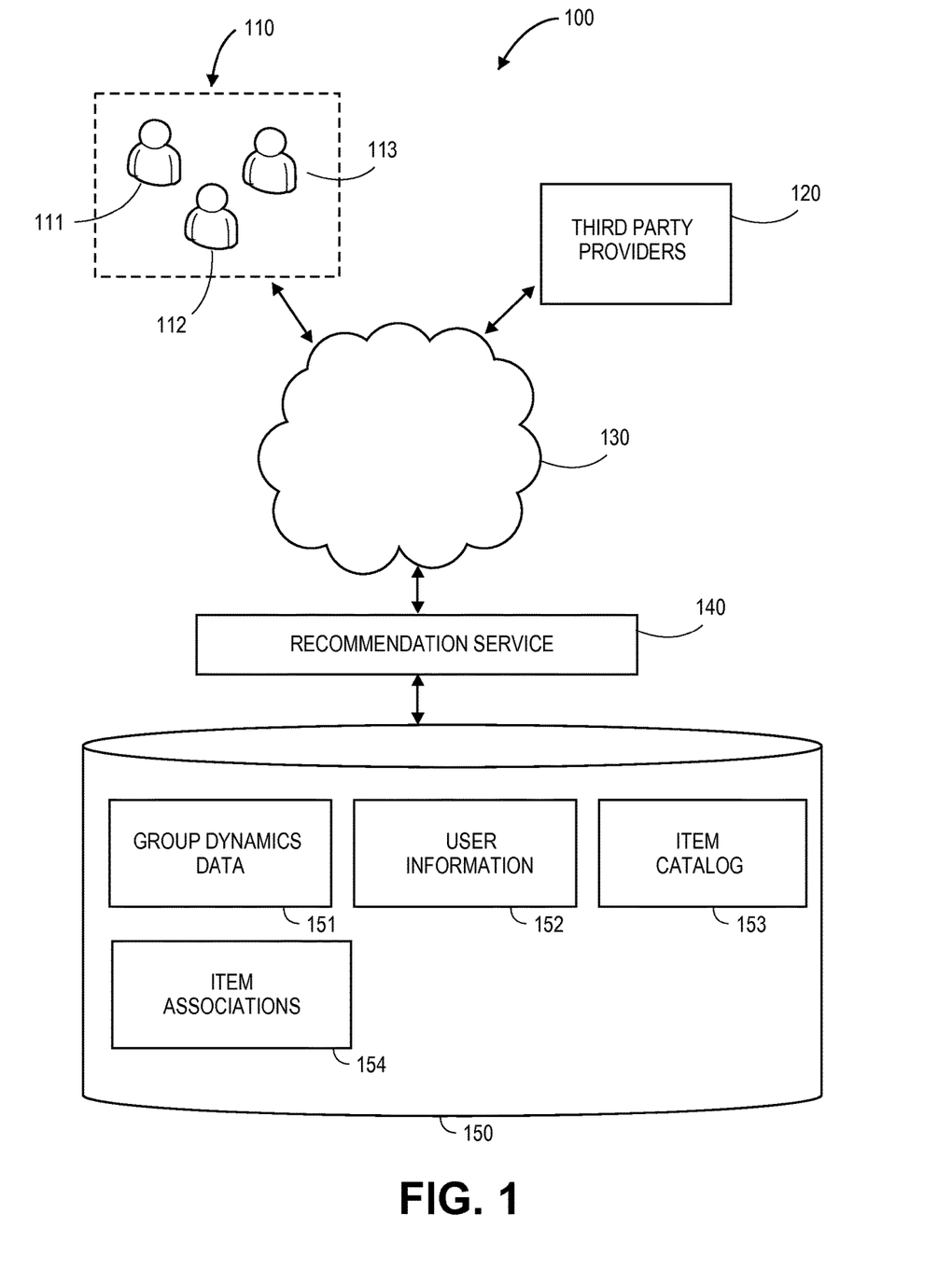
FIG. 1 illustrates an overview of a process for providing group recommendations by way of a recommendation huddle.

FIG. 1 illustrates an overview of a system 100 for providing group recommendations for a recommendation huddle.

Group recommendations can be provided for a recommendation huddle 110 by a recommendation service 140. The recommendation service 140 can have access to an item catalog 153 containing information about various items, item association data 154, user information 152 (e.g., activity, account, queue, rating, or profile information), information from third-party providers 120 (e.g., social networking profile or activity information), the like, and combinations thereof. The recommendation service 140 can also have access to group dynamics data 151, including information about how user preferences are affected by other participants in the recommendation huddle or by recommendation huddle context information. Group dynamics information 151 can be predicted, manually entered by users, or inferred from previous activities as described below. The recommendation service 140 can use some or all of this information to provide to the recommendation huddle 110 a list of recommendations for the group of users (211, 212, 213) as a whole. The group recommendations can be further modified based on user feedback.

Figure 2:
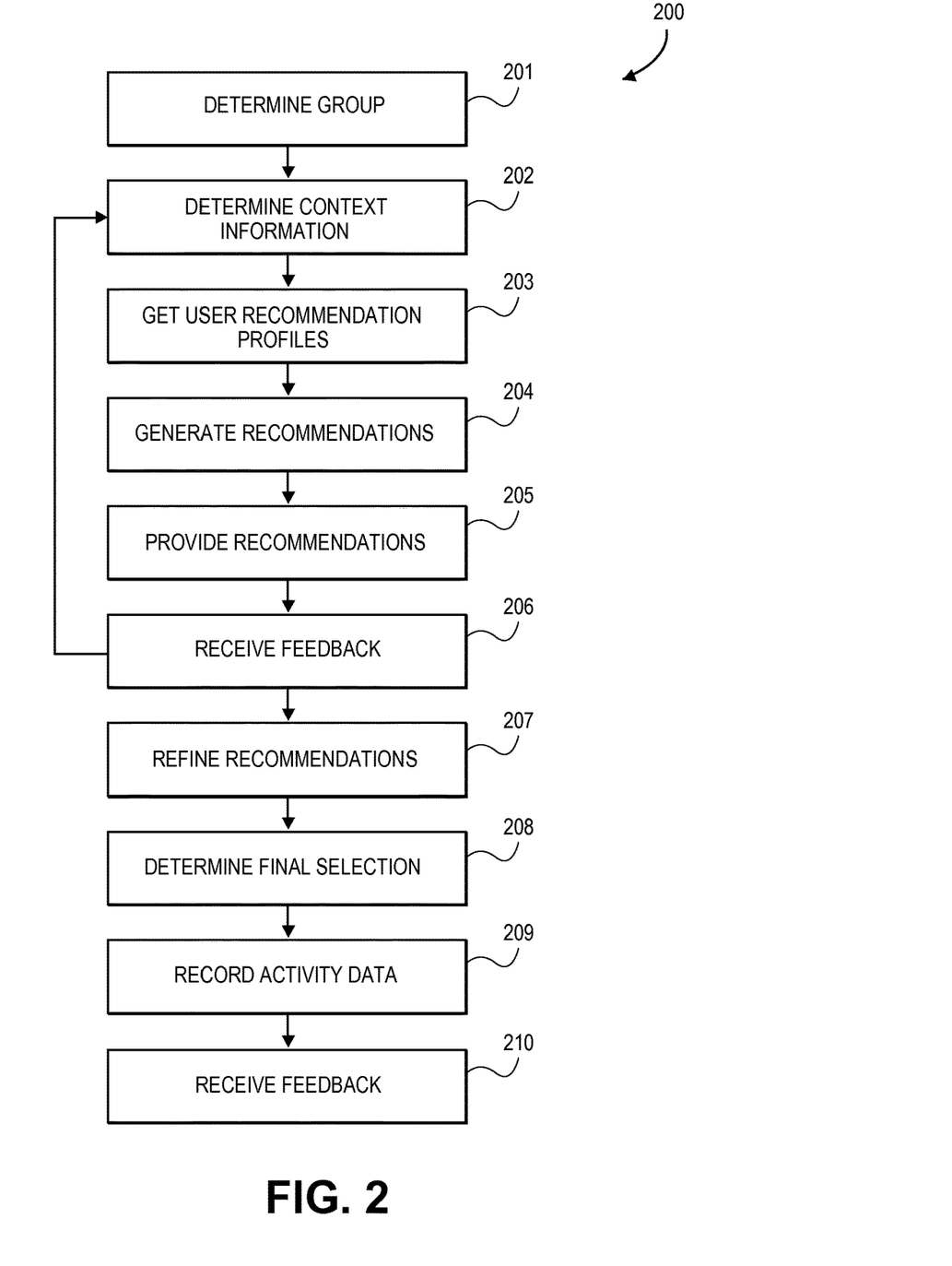
FIG. 2 illustrates an example of a system for providing group recommendations.

FIG. 2 illustrates an overview of a process 200 for providing group recommendations by way of a recommendation huddle.

Initially, at block 201, users participating in the recommendation huddle are determined. Various techniques can be used to determine participating users. For example, in some embodiments, each user is associated with a user device. It should be noted, however, that each user need not have his or her own user device. One or more users can share one or more devices, and in some embodiments, one or more users need not interact with a user device. An initiating user can use her device to initiate a recommendation huddle. The initiating user's device can automatically detect nearby users (e.g., using Bluetooth, near field communications (NFC), RFID, wireless LAN, the like, or combinations thereof) and add those users to the recommendation huddle. Optionally, other users can be required to accept a recommendation huddle invitation before they can be added to the recommendation huddle. In other embodiments, users can be recognized based on physical characteristics (e.g., by facial recognition, fingerprint scanning, iris recognition, or other biometric identification) and added to a recommendation huddle.

In still other embodiments, an initiating user can invite users to participate in a recommendation huddle by sending digital invitations. For example, the digital invitations can be sent by email, instant message, text message, web-based service (e.g., facebook, twitter, Google+, or evite), or the like. Recipients can then accept the invitation to join the recommendation huddle. Users participating in the recommendation huddle can remotely view huddle details, e.g., current recommendations and participating users.

At block 202, context information is determined for the recommendation huddle. This can include information about the type of recommendation sought (e.g., recommendations for movies, songs, restaurants, products, activities, or the like), time-of-day, day-of-week, season, location, venue, nature of the occasion, group size, group makeup, group affiliations, and any other information related to the recommendation huddle. This information can be manually entered (e.g., by the initiating user) or can be automatically detected.

At block 203, recommendation profiles for the users participating in the recommendation huddle are retrieved. A user's recommendation profile can include personal information about the user (e.g., name, age, location, address, profession, other demographic information, or the like); information about the user's interests, preferences, online activities, online purchases, viewed content (e.g., watched movies or downloaded music tracks); social network connections; geolocation information; device information; previously generated recommendations; queued or saved items; and the like.

Recommendation profiles can also include information about group dynamics between and among other users. For example, a user's recommendation profile can contain information about how the user's preferences might change based on characteristics of the other users participating in the recommendation huddle. A user's recommendation profile can also contain information about how the user's preferences might change based on other context information, such as the recommendation huddle context information mentioned above.

At block 204, group recommendations are generated for the recommendation huddle. A user's recommendation profile, in combination with other data such as mined behavioral item-to-item associations, can be used to generate a list of recommendations for the user. Information about the recommendation huddle such as the context information mentioned above and the list of participating users can be used to weight, reorder, prioritize, filter, or otherwise modify the generated recommendations. This reflects that a user's preferences can change based on the context of a group recommendation. The lists of recommendations for the users participating in the recommendation huddle can then be combined to yield a single list of recommended items for the recommendation huddle. The combination process can take into account additional context information, for example, by applying rules corresponding to the type of recommendation. The combination process can vary the weight or priority given to each user's list of recommendation, for example, based on a flexibility rating specified, retrieved, or calculated for the user.

In other embodiments, recommendation profiles for participating users, recommendation huddle context information, and related data can be used to generate directly a list of recommended items without combining lists of recommendations corresponding to individual users.

At block 205, group recommendations are provided to the users participating in the recommendation huddle. For example, some or all of the participating users' devices can display a recommendation huddle detail display, which includes information about recommended items. From the recommendation huddle detail display, additional information about recommended items can be accessed and displayed. Information about which users are likely to enjoy or have previously viewed recommended items can be displayed. Controls on the recommendation huddle detail display can allow a user to invite more users, to view details about and interact with participating users, to set personal preferences for the recommendation huddle, to opt out of the recommendation huddle, or to otherwise exercise applicable control over the details of the recommendation huddle. In some embodiments, one or more of the recommended items can be automatically selected and initiated, purchased, queued, played, or the like. For example, where the recommendation huddle provides recommendations for streaming media (e.g., movie or song titles), one or more of the recommended titles can be automatically streamed to a media device or queued in a playlist, rather than first requesting feedback from users.

At block 206, feedback on the recommendations can be provided. For example, participating users can vote or otherwise indicate a preference or dislike for particular recommendations. At block 207, the recommendations provided for the recommendation huddle can be refined based on the feedback. For example, recommended items receiving more votes can be moved higher in the list of recommended items. Optionally, negative feedback from participating users can be used to remove or demote certain recommended items. Feedback from a user can also be used to adjust the user's flexibility rating.

At block 208, a final group selection can be made for the recommendation huddle. For example, one or more of the recommended items receiving the most votes can be provided as final recommendations. In other embodiments, a single item (e.g., selected randomly, by number of votes, or by huddle context information) can be provided as a final recommendation. Details about final recommendations can be provided to participating users. Such details can be tailored to the recommendation huddle context information, such as a location of one or more of the participating users. Selectable options (e.g., buttons, hyperlinks, forms, or other controls) can be provided to allow users to initiate, pursue, purchase, or otherwise proceed with selected recommendations. In some embodiments, one or more of the recommended items can be automatically selected and initiated, purchased, queued, played, or the like.

At block 209, user activity data recorded during the duration of the recommendation huddle can be organized and stored persistently. Such activity data can be used to update user recommendation profiles, establish information about group dynamics, and to provide future individual and group recommendations.

Group Recommendation Service

Various techniques can be used to generate item recommendations. For example, user activity with respect to an electronic catalog can be monitored and recorded. The recorded information can be mined to detect associations (e.g., behavioral associations) among items in the catalog. Related techniques are described in U.S. Publication No. 2002/0019763, filed 29 Mar. 2001, titled "Use of product viewing histories of users to identify related products," U.S. application Ser. No. 12/354,233, filed 15 Jan. 2009, titled "System for detecting probabilistic associations between items," and U.S. Publication No. 2002/0198882, filed 14 Jan. 2002, titled "Content Personalization Based on Actions Performed During a Current Browsing Session," the complete disclosures of which are hereby incorporated by reference.

Recommendations can also be generated based on user activity or data on third party providers (e.g., social networking sites), or on activities of related users. Related techniques are described in U.S. application Ser. No. 12/783,370, filed 19 May 2010, and in U.S. application Ser. No. 13/044,235, filed 9 Mar. 2011, the complete disclosures of which are hereby incorporated by reference.

Where recommendations are generated for a group of users, various techniques can be used to provide recommendations for the group as a whole. For example, item queues, recommendation lists, and wish lists of individual users in a group can be combined to form a master queue or list for the group as a whole. User recommendation profiles can also be combined into a single recommendation profile associated with the group, and recommendations can be generated based on the group recommendation profile. Further still, recommendations can be based on prior selections, actions, behaviors, or other history associated with the same group or with related groups. A group can therefore be associated with its own profile based on the item selection activities of the group. Related techniques, which may be used in combination with the techniques described herein, are described in U.S. Pat. No. 7,756,753, filed 29 Mar. 2006, titled "Services for recommending items to groups of users," the complete disclosure of which is hereby incorporated by reference.

Figure 3:
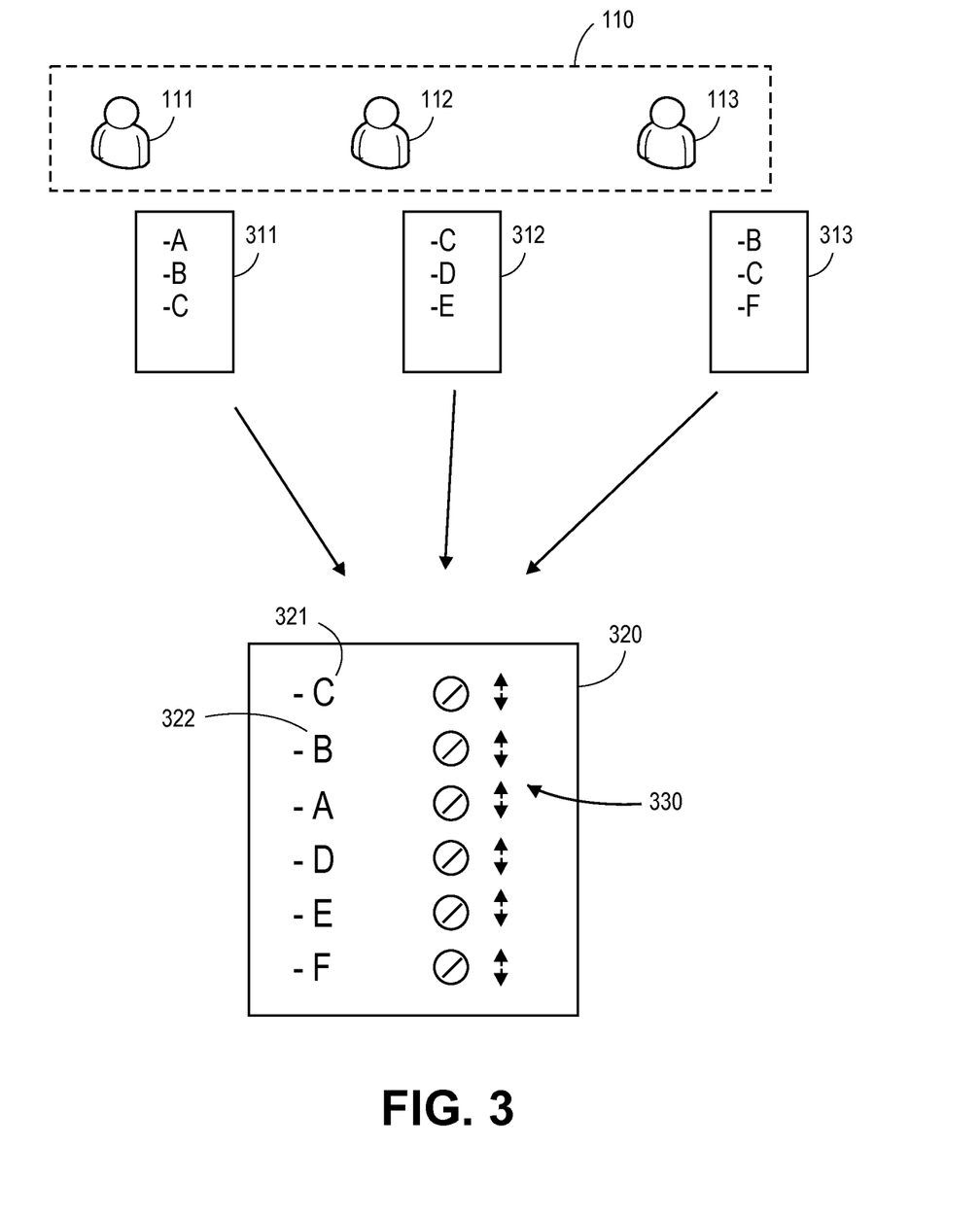
FIG. 3 illustrates an example of a technique for generating group recommendations.

FIG. 3 shows an example of one embodiment wherein a recommendation huddle 210 can be initiated to provide group recommendations of a particular type (e.g., streaming movie titles). Item catalog information, item association data, and user profile and activity information can be used to generate a list of recommendations (311, 312, 313) for each user (211, 212, 213) participating in the recommendation huddle 210. Items in a user's list of recommendations can then be weighted or otherwise modified based on group dynamics information corresponding to the user and recommendation huddle context information. The lists of recommendations for users participating in the recommendation huddle can be combined into a list of group recommendations 320. Priority can be given to recommended items (321, 322) that appear in the lists of multiple users. Further, each user can input an associated flexibility rating that can be used to determine the importance or weight of a user's recommendations relative to those of other users in the recommendation huddle. Users participating in the recommendation huddle can provide feedback (e.g., using voting or ranking controls 330) on items in the list of group recommendations 320. Items in the list of group recommendations can be further weighted or prioritized based on user feedback.

Group Dynamics Behavior Collecting

The recommendation service 240 can record, log, or otherwise keep track of some or all information about a recommendation huddle, including activities of the participating users. This information can be used to infer group dynamics between and among users of the recommendation service. Information about group dynamics, in turn, can be used to provide recommendations tailored to the social dynamics of those participating in a recommendation huddle.

For example, a user's preferences may be dependent on the nature of the group activity as characterized, at least in part, by the participants: User A may prefer, or at least be willing to accept, a certain genre of movie titles when she is watching a movie with only User B; however, when User A is watching a movie with Users C, D, and E, she may prefer not to see movie titles of that same genre. Thus, information about how a user's preferences change based on other participating users can be recorded. Information about how a user's preferences change with group size, group diversity, group associations (e.g., common affiliations or related organizations) and other group characteristics can also be recorded.

User influence information can also be collected. For example, information about the frequency with which a user's selected, recommended, or highly-rated items correspond with group selections can be used to determine a measure of the user's influence on a group. User influence ratings can be used in the generation of group recommendations. For example, recommendations can be targeted to a most influential member or members of a group, based on the users' influence ratings.

Further still, a user's preferences can depend on other contextual information related to the recommendation huddle, and this information can be recorded and logged. For example, time-of-day, day-of-week, season, location, venue, type of activity, group size, group diversity, group affiliations, and other details can affect a user's preferences and flexibility, and this information can be recorded.

Examples of Various Embodiments

Further details may be understood by examining examples of various example features.

Group Movie Selection Example

In an example of one embodiment, the recommendation service 240 can be provided to a group of users wishing to collectively select one or more items from a catalog of items. While the embodiment is applicable generally to recommendations for any type of item, the present example will be described in the context of providing group recommendations for movie titles.

A group of users often want to agree on a single movie title to watch, either for rental, for viewing in a theatre, or for streaming to a multimedia device. Each user may have a queue of various titles that he or she wishes to watch. Additionally, each user may have a list of recommended movie titles automatically generated based at least in part on the user's personal information, purchase or activity history, or movie ratings. A goal of this example is to provide unified recommendations for the group of users as a whole.

The users can begin in geographic proximity and agree to find a movie to watch based at least on the preferences of those present. Each user can have an associated user device. A user device can be a cell phone, smart phone, tablet computer, laptop, netbook, desktop computer, personal entertainment device, electronic book reader, other wireless device, set-top or other television box, media player, game platform, kiosk, or any other electronic device with appropriate interface and communication facilities. In one example, a user device is a smartphone having a particular app that provides an interface for coordinating group recommendations.

One or more of the users can initiate a group recommendation huddle on her device. An initiating user can provide details about the type of recommendation sought (in this example, a movie title), timeframe or location information, known or desired constraints on the recommended items (for example, a preselected genre such as comedy, or an MPAA rating suitable for young adults), and other information about the recommendation huddle. Optionally, the initiating user can specify information about how the recommendations should be determined (for example, a limitation that the recommendations should include only movies that no participating user has previously seen). The initiating user can also specify information about how users should provide feedback on recommended items (for example, opting for a plurality voting process).

Each user device can be equipped with communication facilities to allow the device to discover other devices in the area. For example, user devices can use Bluetooth, near field communications (NFC), RFID, wireless LAN, wired LAN, the like, or combinations thereof to locate and identify nearby devices. In some embodiments, the initiating user device (or another device designated by the initiating user) identifies proximate user devices and communicates corresponding identifiers to a remotely located recommendation service (e.g., a recommendation web service available on the public Internet). The recommendation service, in turn, can communicate to the identified user devices an invitation to join the recommendation huddle. In other embodiments, the initiating user device transmits, without the recommendation service as an intermediary, a recommendation huddle invitation to the other user devices (e.g., using Bluetooth, NFC, or the like).

Figure 4:
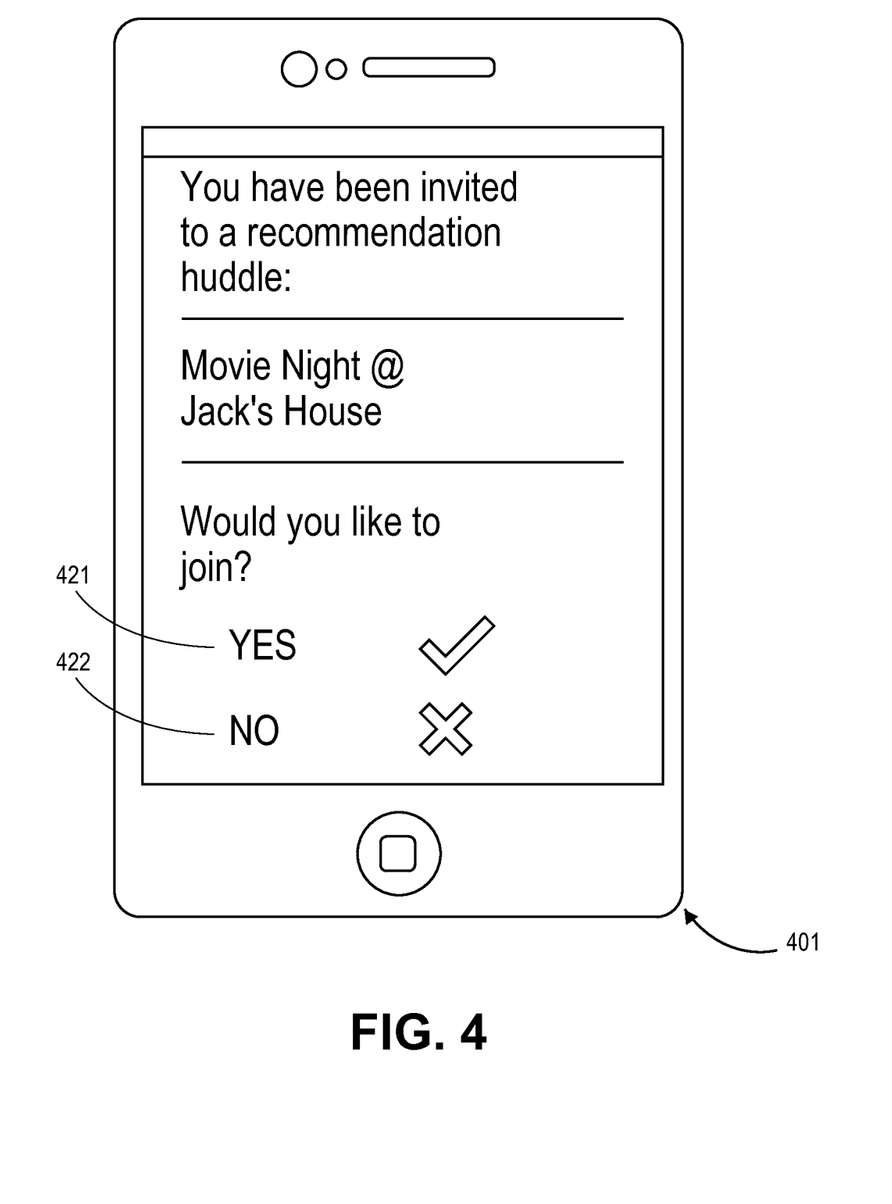
FIG. 4 illustrates an example of an interface for responding to a recommendation huddle invitation.

Each of the participating user devices can display an interface allowing its user to accept the recommendation huddle invitation. FIG. 4 shows an example of an interface for allowing a user to accept a recommendation huddle invitation. If a user declines the invitation (e.g., by selecting an option not to join 422), the recommendation service can be notified and the recommendation huddle can be denied access to the user's queue or recommendation profile. A user's recommendation profile can include personal information about the user (e.g., name, age, location, address, profession, other demographic information, or the like); information about the user's interests, preferences, online activities, online purchases, item ratings or reviews, viewed content (e.g., watched movies or downloaded music tracks), or social network connections; geolocation information; device information; previously generated recommendations; queued or saved items; and the like. In this manner, users who do not wish to join the recommendation huddle can decline the recommendation huddle invitation and prevent access to their otherwise private user information and recommendation profile.

If a user accepts a recommendation huddle invitation (e.g., by selecting an option to join 421), the user's device 401 can transmit the acceptance to the recommendation service. The recommendation service can then use the user's recommendation profile and other user information to generate recommendations for the recommendation huddle. Where a user's device is unable to communicate with the recommendation service (e.g., because Internet connectivity is not available), the users can digitally sign the received huddle invitation and return it to the initiating user. The initiating user can then transmit the signed invitation to the recommendation service, which can verify the signing user's digital signature and allow the signing user's information to be used in the recommendation huddle. Alternatively, users can preselect recommendation information that is available to anyone, to certain social groups, or to specific individuals. Users can also provide authorization using a password or other authentication code, which the user can enter on another user's device or other input device associated with the recommendation huddle.

Figure 5:
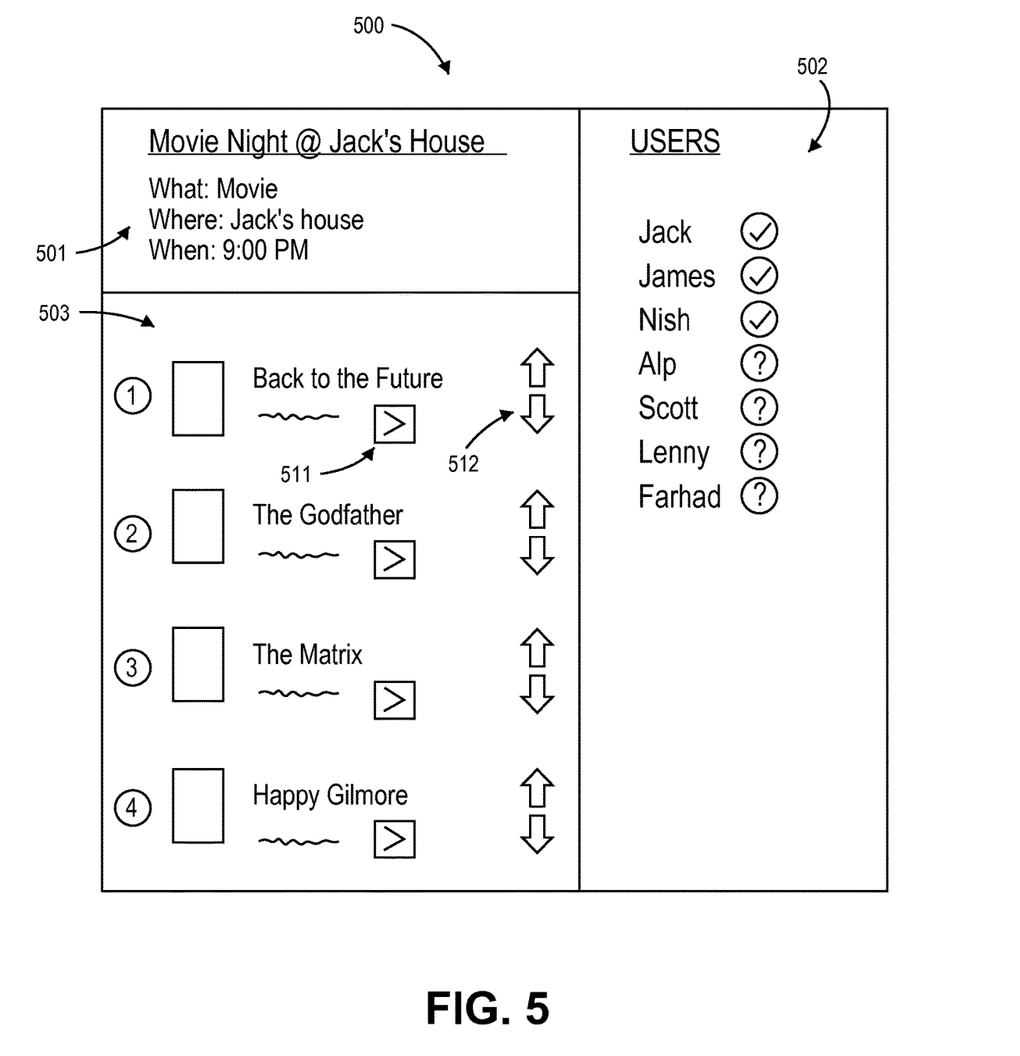
FIG. 5 illustrates an example of a recommendation huddle detail display.

Upon accepting a recommendation huddle invitation, a user's device can present a recommendation huddle detail display. Likewise, an initiating user's device can present a recommendation huddle detail display after initiating the recommendation huddle. An example of a recommendation huddle detail display is illustrated in FIG. 5. The recommendation huddle detail display 500 can provide information 501 about the recommendation huddle, a list of users 502 that have been invited, have accepted, or have declined an invitation, and a list of group recommendations 503 provided by the recommendation service (e.g., group recommendations based on users in the huddle that have accepted the invitation).

From the recommendation huddle detail display, additional information about recommended items can be accessed and displayed (e.g., by clicking an item details button 511). For example, a user can view information about a particular recommended movie title including cast, production credits, genre, video clips (e.g., trailers or excerpts), other related videos, user and critic reviews and ratings, or if the movie is in theatres, theatre information including directions, accommodations, and show times. Optionally, this information can be tailored based on geolocation data associated with the initiating user, other participating users, or all users in the recommendation huddle.

Users can also view information about which users in the huddle are likely to enjoy a recommended item (e.g., by determining which users contributed most to the item's recommendation). Additionally, a user can view information about which recommended movie titles have been viewed previously by the user or by other users in the recommendation huddle. Controls on the recommendation huddle detail display can allow a user to invite more users, to view details about and interact with participating users, to set personal preferences for the recommendation huddle (e.g., a flexibility rating), to opt out of the recommendation huddle, or to otherwise exercise applicable control over the details of the recommendation huddle.

User devices can communicate with the recommendation service, which can provide item recommendations tailored for the recommendation huddle. The recommendation service can look up in a user database information about users participating in the recommendation huddle and retrieve recommendation profiles for those users. The recommendation profiles of the participating users can be weighted, combined, and integrated to provide a collective list of recommended items for the group as a whole. In doing so, the recommendation service can also take into account group dynamics among the participating users, the type of activity, and other contextual information related to the recommendation huddle. In some embodiments, each participating user can specify a flexibility rating for the recommendation huddle, which can provide an indication to the recommendation service of the user's willingness to deviate from her general or predicted preferences. In other embodiments, one or more users in the recommendation huddle can specify particular criteria (e.g., in addition to any criteria specified by the initiating user) for the recommendation huddle. For example, if a movie is being selected for a social gathering, a participating user can specify that a certain category or genre of movies (e.g., horror movies) should be excluded from the recommendations, even where such movies would otherwise be recommended to the group.

Optionally, users in the recommendation huddle, including the initiating user, can provide feedback on the current recommendations. For example, each user can use her device to vote (e.g., using controls 512) on recommended items listed in the recommendation huddle detail display 500. User votes can be used to rank or weight provided recommendations, to narrow down the recommendations to a smaller subset of the provided recommendations, or to select one or more of the provided recommendations according to a plurality or majority voting process. In some embodiments, each user can have one or more blackball votes, which can allow the user to specify one or more of the recommended items that are unacceptable to the user, and accordingly, allow the user to remove the one or more blackballed items from the list of recommended items notwithstanding the voting process. As users submit votes and other appropriate feedback, the recommendation huddle detail displays of the users can be updated to reflect the most recent voting and feedback data. Voting and feedback information can be private to the voting user, but optionally can be visible to some or all of the other users participating in the recommendation huddle.

Based on received user feedback, one or more final recommended items can be determined and presented to the users. One or more of the participating users can be presented with various options regarding the final recommended items. For example, an option to purchase, rent, queue, stream, or tag a finally recommended movie title can be presented. If, for example, a movie title is playing in theatres, theatre and show time information can be presented along with an option to purchase tickets. Coupons, discounts, promotions, specials (movie bundles), and other offers related to recommended movie titles can be presented to the participating users. These offers can be specifically generated and tailored for the recommendation huddle in real-time or can be retrieved from a database or other listing. Purchasing functionality can be linked to each user's existing account, for example, to enable seamless purchasing by each user. If, on the other hand, a movie is available for streaming, a recommended title can be selected for purchase or queuing. Optionally, the streaming video can be pushed or sent to a specified entertainment device. For example, an Internet enabled entertainment device associated with the initiating user and having a connected display device (e.g., an LCD, OLED, plasma, or other display) and audio reproduction device (e.g., integrated speakers or an amplifier connected to surround speakers) can be designated as the recipient device. Upon selection of a final recommendation, streaming to the recipient device can be automatically initiated.

In various embodiments, the initiating user or another participating user can be presented with a list of streaming- and multimedia-capable devices both associated with and in geographic proximity to one or more users participating in the recommendation huddle. As an example, devices belonging to one or more users in the recommendation huddle and capable of streaming and displaying the selected movie title can be determined by the recommendation service. This determination can be made using geolocation data, user account information, prior configuration or setup information, or other user and device information. The owner of or user associated with such a device can then be presented with the option of selecting her device as the streaming destination for the recommendation huddle. In many instances, the streaming destination device can be associated with the initiating user, but this need not be the case. For example, a houseguest could have initiated the recommendation huddle and invited the host user and other guests, but the appropriate streaming device (e.g., a Boxee Box, Roku, Google TV, Apple TV, or other internet multimedia device) could be associated with and thus subject to control and approval of the host user.

In some embodiments, one or more recommended items can be automatically selected (e.g., randomly, by number of votes, or based on huddle context information) and purchased, rented, queued, streamed, or tagged. Such automatic selection can occur instead of or in addition to receiving user feedback on item recommendations provided to the recommendation huddle. For example, instead of receiving feedback on recommended movie titles, one of the recommended titles can be automatically selected and streamed to a multimedia device. Also for example, automatic selection and streaming can be initiated in response to reaching a threshold number of users participating in the recommendation huddle or in response to receiving a certain amount of feedback on recommended items. Automatic selection and streaming can, in some embodiments, be initiated by a user (e.g., by selecting an option, button, or input control).

A huddle detail display can also be provided to a selected multimedia device, for example, the intended display device for a streaming movie title. In this manner, users proximate to the intended display device can view details about the current status of the recommendation huddle and view, in near real-time, updated recommendation huddle information including the current participant list and updated list of recommended items. When a final selection has been determined, the intended display device can begin streaming the selected title. Optionally, the initiating user or the user associated with the intended display device can retain control over and operate the intended display device via an interface on the corresponding user device. For example, where a user's device is a smartphone, the smartphone can present an interface for controlling the intended display device and can (e.g., directly or via the recommendation service) send commands to and receive information from the intended display device.

If one or more users invited to a recommendation huddle decline the invitation or are otherwise unable to participate in the group, such users can still receive huddle recommendations and information. For example, where a particular user is unable to attend a viewing of a streaming movie associated with a recommendation huddle, the user can be sent an offer (e.g., at a special price) to view the movie later from another location. Also for example, where a particular user is unable to attend the showing of a movie title at a theatre or other venue, the user can be sent an offer (e.g., at a special price) to attend a different viewing (e.g., at a later time or at an alternative venue).

User Recognition

In a refinement to the example embodiment described above, users can be automatically recognized using various identification techniques. For example, users can be recognized by an input device using physical characteristics (e.g., by facial recognition, fingerprint scanning, iris recognition, voice recognition, or other biometric identification). In one embodiment, a camera on the initiating user's smart phone can use voice or facial recognition to identify nearby users and add them to a recommendation huddle. In another embodiment, a camera connected to a multimedia device (e.g., Xbox Kinect) can be used to identify nearby users visually or via audio and add them to a recommendation huddle. Identification, such as facial recognition, can be provided by the input device or by transmitting appropriate information (e.g., a snapshot or voice sample) to the recommendation service. Identified users can be automatically added to a recommendation huddle or can be required to accept an invitation as described above.

Restaurant Selection Example

In an example of another embodiment, a recommendation service can be provided to a group of users wishing to collectively select one or more items from a catalog of items. While this example is applicable generally to recommendations for any type of item, the present example will be described in the context of providing group recommendations for restaurants.

A group of users often want to agree on a restaurant or other eating establishment. Each user may have a list of various restaurants at which she would like to eat. Additionally, each user may have a list of recommended restaurants automatically generated based on the user's personal information, food or venue preferences, restaurant ratings or reviews, or recent restaurant visits. A goal of this example is to provide unified restaurant recommendations for the group of users as a whole.

The users can begin in geographic proximity and agree to find a restaurant at which to eat based at least on the preferences of those present. As in the previous example, each user can have an associated user device. One or more of the users can initiate a group recommendation huddle on her device, for example, by sending recommendation huddle invitations to the other present users. The initiating user can provide various details, for example, information about the type of cuisine desired, timeframe or location information, known or desired constraints on the recommended items (e.g., limitations on price range or constraints due to food allergies), and other information about the recommendation huddle. Optionally, the initiating user can specify information about how the recommendations should be determined (for example, a limitation that the recommendations should include only restaurants that no participating user has previously visited). The initiating user can also specify information about how users should provide feedback on recommended items (for example, opting for a plurality voting process).

Each of the participating user devices can display an interface allowing its user to accept the recommendation huddle invitation. If a user accepts a recommendation huddle invitation, the user's device can present a recommendation huddle detail display. Likewise, the initiating user's device can present a recommendation huddle detail display after initiating the recommendation huddle. The recommendation huddle detail display can provide information about the recommendation huddle, a list of users that have been invited, have accepted, or have declined an invitation, and a list of group recommendations provided by the recommendation service (e.g., group recommendations based on users in the huddle that have accepted the invitation). From the recommendation huddle detail display, additional information about recommended items can be accessed and displayed. For example, a user can view information about a particular recommended restaurant including price range, attire, reservations, parking, delivery/ take-out, accommodations, noise levels, user and critic reviews and ratings, distance and directions, or real-time or predicted crowdedness information. Optionally, this information can be tailored based on geolocation data associated with the initiating user, other participating users, or all users in the recommendation huddle. Controls on the recommendation huddle detail display can allow a user to invite more users, to view details about and interact with participating users, to set personal preferences for the recommendation huddle (e.g., a flexibility rating), to opt out of the recommendation huddle, or to otherwise exercise applicable control over the details of the recommendation huddle.

User devices can communicate with the recommendation service, which can provide item recommendations tailored for the recommendation huddle. Optionally, users in the recommendation huddle, including the initiating user, can provide feedback on the current recommendations. For example, each user can user her device to vote on recommended items listed in the recommendation huddle detail display. User votes can be used to rank or weight provided recommendations, to narrow down the recommendations to a smaller subset of the provided recommendations, or to select one or more of the provided recommendations according to a plurality or majority voting process. As users submit votes and other appropriate feedback, the recommendation huddle detail displays of the users can be updated to reflect the most recent voting and feedback data. Voting and feedback information can be private to the voting user, but optionally can be visible to some or all of the other users participating in the recommendation huddle.

Based on received user feedback, one or more final recommended items can be determined and presented to the users. One or more of the participating users can be presented with various options regarding the final recommended items. For example, an option to call, get directions to, make a reservation at, or place an order with a recommended restaurant can be presented. Such functionality can be linked to each user's existing account, for example, to enable each user to seamlessly make reservations or purchase menu items. Further details, including menu options, crowdedness information, or directions, can be presented. Coupons, promotions, specials (e.g. happy-hour specials), and other offers related to recommended restaurants can be presented to the participating users. These offers can be specifically generated and tailored for the recommendation huddle in real-time or can be retrieved from a database or listing of public offers. In various embodiments, establishment proprietors can indicate to the recommendation service that certain types or quantities of offers should be generated based on real-time information, for example, crowdedness of the restaurant. For example, offers can be generated more frequently for a restaurant when it is not crowded or has a low number of existing reservations.

Electronic Invite Example

In a refinement to the example embodiment described above, a recommendation service can be provided to a group of users not necessarily proximate to one another. While the embodiment is applicable generally to recommendations for any type of item, the present example will be described in the context of providing group recommendations for restaurants.

As described above, a group of users often want to agree on a restaurant or other eating establishment. Each user may have a list various restaurants at which she would like to eat. Additionally, each user may have a list of recommended restaurants automatically generated based on the user's personal information, food or venue preferences, restaurant ratings or reviews, or recent restaurant visits. A goal of this example is provide unified restaurant recommendations for the group of users as a whole.

An initiating user can invite users to participate in a recommendation huddle by sending digital invitations. For example, the digital invitations can be sent by email, instant message, text message, social networking service (e.g., facebook, twitter, foursquare, yelp, Google+, or evite), or the like. As described above, the initiating user can provide various details, for example, information about the type of cuisine desired, timeframe or location information, known or desired constraints on the recommended items (e.g., limitations on price range or constraints due to food allergies), and other information about the recommendation huddle. Optionally, the initiating user can specify information about how the recommendations should be determined (for example, a limitation that the recommendations should include only restaurants that no participating user has previously visited). The initiating user can also specify information about how users should provide feedback on recommended items (for example, opting for a plurality voting process).

Recipients can then view and accept the invitation to join the recommendation huddle. In some embodiments, users can respond to a recommendation huddle invitation by following a link the invitation. The link can include parameters (e.g., HTTP GET, POST, PUT, or DELETE parameters) identifying the user, invitation, recommendation huddle, or other related information. Users participating in the recommendation huddle can remotely view huddle information via a recommendation huddle detail display. The recommendation huddle detail display can, for example, be provided in a smart phone app or as a webpage accessible via the Internet.

As described above, the recommendation huddle detail display can provide information about the recommendation huddle; a list of users that have been invited, have accepted, or have declined an invitation; a list of group recommendations provided by the recommendation service; additional information about recommended items; controls for allowing users to invite more users, view details about and interact with participating users, set personal preferences for the recommendation huddle (e.g., a flexibility rating), opt out of the recommendation huddle, or otherwise exercise applicable control over the details of the recommendation huddle. Additionally, the recommendation huddle detail display can provide functionality such as group messaging, chat, video chat, sharing, posting, and the like. For example, the recommendation huddle detail display can provide posting functionality for users to comment on the current recommendations, suggest changes, or coordinate activities.

As described above, users in the recommendation huddle can provide feedback on the current recommendations, and the recommendation service can use the feedback to provide updated recommendations. One or more final recommended items, along with related information and options, can be determined and presented to participating users.

Music Playlist Selection Example

In an example of another embodiment, a recommendation service can be provided to a group of users wishing to collectively select one or more items from a catalog of items. While the embodiment is applicable generally to recommendations for any type of item, the present example will be described in the context of providing group recommendations for music selections.

A group of users often want to play music, for example, at a social gathering, for the enjoyment of all those present. Each user may have her own library of music and related preference information (e.g., a list of preferred artists, albums, songs, or genres). Additionally, each user may have a list of recommended artists, albums, or songs automatically generated based on the user's personal information, music tastes, music ratings or reviews, or recently played tracks. A goal of this example is provide unified music choices or playlists for the group of users as a whole.

The users can begin in geographic proximity and agree to create a music huddle to play or recommend music selections based at least on the preferences of those present. As in the previous example, each user can have an associated user device. One or more of the users can initiate a music huddle on her device, for example, by sending music huddle invitations to the other present users. The initiating user can provide various details, for example, information about the type of music preferred, age suitability, known or desired constraints on the recommended music (e.g., constraints on track length or encoding quality), and other information about the music huddle. Optionally, the initiating user can specify information about how the recommendations should be determined (e.g., a limitation that recommended music should be chosen from a particular music library, combination of music libraries, device, or streaming service). The initiating user can also specify information about how users should provide feedback on recommended items. For example, the music huddle can generate a huddle playlist and users can vote on music selections in the huddle playlist to change the order in which the music selections are played. Optionally, users can suggest new music selections for the huddle playlist or vote to skip a particular track.

Each of the participating user devices can display an interface allowing its user to accept the music huddle invitation. If a user accepts a music huddle invitation, the user's device can present a music huddle detail display. Likewise, the initiating user's device can present a music huddle details display after initiating the music huddle. The music huddle detail display can provide information about the music huddle, a list of users that have been invited, have accepted, or have declined an invitation, and a playlist or other selection of music choices provided by the recommendation service (e.g., music recommendations based on users in the huddle that have accepted the invitation).

From the music huddle detail display, additional information about recommended music tracks can be accessed and displayed. For example, a user can view details about a particular recommended track including artist information, album information, album art, genre, release date, lyrics, related media such as videos or websites, and the like. Optionally, this information can be tailored based on geolocation data associated with the initiating user, other participating users, or all users in the music huddle. For example, information about nearby upcoming shows by the selected artist can be displayed. Controls on the music huddle detail display can allow a user to invite more users, to view details about and interact with participating users, to set personal preferences for the music huddle (e.g., a flexibility rating), to opt out of the music huddle, or to otherwise exercise applicable control over the details of the music huddle.

Further still, participating users can be presented with various options regarding music selections in the music huddle playlist. For example, options to flag, purchase, download, tag, add to a playlist, add to an online music library, share, or rate recommended or playing tracks can be provided. Deals, promotions, or specials associated with the music huddle or playlist tracks can also be presented to the users. In some embodiments, users can be provided with an option to purchase a song, album, or concert tickets at a reduced price. These offers can be specifically generated and tailored for the music huddle in real-time or can retrieved from a database or listing of public offers.

The recommendation service can determine music recommendations tailored for the music huddle and provide a playlist of recommended tracks. Optionally, users in the music huddle, including the initiating user, can provide feedback on the current playlist. For example, each user can user her device to vote on music selections in the music huddle playlist. User votes can be used to rank, weight, reorder, or otherwise modify selections in the playlist, to narrow down the recommendations to a smaller subset of the provided recommendations, or to refine additional recommendations by detecting particular music selection attributes related to current group preferences. As an example, if users are preferring upbeat or popular music selections, future additions to the music huddle playlist can be tailored accordingly notwithstanding other preferences associated with recommendation profiles of participating users. As users submit votes and other feedback, the music huddle detail display can be updated to reflect the most recent music huddle playlist provided by the recommendation service. Voting and feedback information can be private to the voting user, but optionally can be visible to some or all of the other users participating in the music huddle.

One or more of the participating users, e.g., the initiating user, can specify a recipient entertainment device to which the huddle playlist should be sent or streamed. For example, an Internet enabled entertainment device associated with the initiating user and having suitable audio reproduction facilities (e.g., integrated speakers or an amplifier connected to surround speakers) can be designated as the recipient device. In some embodiments, the initiating user or another participating user can be presented with a list of streaming- and multimedia-capable devices both associated with and in geographic proximity to one or more users participating in the music huddle. As an example, devices belonging to one or more users in the music huddle and capable of streaming and playing music can be determined by the recommendation service. This determination can be made using geolocation data, user account information, prior configuration or setup information, or other user and device information. The owner of or user associated with such a device can then be presented with the option of selecting her device as the streaming destination for the music huddle. In many instances, the streaming destination device can be associated with the initiating user, but this need not be the case. For example, a houseguest could have initiated the music huddle and invited the host user and other guests, but the appropriate streaming device (e.g., a receiver, wireless speaker system, home theatre, or other internet multimedia device) could be associated with and thus subject to control and approval of the host user.

Streaming to the recipient multimedia device can be automatically initiated. Music selections can be played from local storage on the selected entertainment device; streamed from an Internet music service (e.g., Pandora, Grooveshark, Spotify, Turntable.fm, internet radio stations, or the like); sent or streamed from user devices (e.g., from music stored on smart phones of participating users); sent or streamed from Internet-based music libraries (e.g., from Amazon Cloud, iCloud, Google Music, or other services associate with participating users); the like; or combinations thereof. One or more users can be provided, e.g., on their user devices, with an interface for controlling playback of music selections. For example, the initiating user or the user associated with the recipient multimedia device can retain control over and operate the recipient display device via an interface on the corresponding user device. For example, where a user's device is a smartphone, the smartphone can present an interface for controlling music playback (e.g., to pause or skip a track) or sending commands to the recipient device (e.g., to adjust volume).

In some embodiments, recommended song titles can be automatically selected (e.g., randomly, by number of votes, or based on huddle context information), queued, streamed, or played. Such automatic selection can occur instead of or in addition to receiving user feedback on item recommendations provided to the recommendation huddle. For example, instead of first receiving feedback on recommended song titles, one or more of the recommended titles can be automatically selected, added to the huddle playlist, and streamed to a multimedia device. Also for example, automatic selection and streaming can be initiated in response to reaching a threshold number of users participating in the recommendation huddle or in response to receiving a certain amount of feedback on recommended items. Automatic selection and streaming can, in some embodiments, be initiated by a user (e.g., by selecting an option, button, or input control).

In some embodiments, a music huddle detail display can also be provided to the recipient multimedia device or to another multimedia device. For example, a music huddle detail display could be provided to a nearby display device. In this manner, users proximate to the display device can view details about the current status of the music huddle and view, in near real-time, updated playlist, participant, and related information. In one embodiment, the huddle detail display can show information about which participating users, based on their recommendation profiles, are likely to enjoy currently playing tracks and other tracks in the playlist.

Terminology

Depending on the embodiment, certain acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system for providing group recommendations, the system comprising:
 a recommendations module implemented in a first user device comprising memory programmed with instructions and a processor configured to execute the instructions to cause the recommendations module to:
  automatically detect that second user devices are in proximity to the first user device based on wireless information received from the second user devices, the second user devices operated by a plurality of users;
  in response to said detection, communicate to the second user devices information about a recommendation huddle over a wireless network, without using a server as an intermediary, wherein the information about the recommendation huddle includes an electronic request for users of the second user devices to join the recommendation huddle;
  receive electronic acceptances from selected ones of the users over the wireless network, the electronic acceptances indicating that the selected users agree to join the recommendation huddle;
  receive an indication from a first user declining to join the recommendation huddle;
  output for display on the first user device an indication of those of the selected users that have accepted the electronic request to join the recommendation huddle;
  transmit, to a server implementing a recommendation service over the wireless network, a request to programmatically generate, based at least in part on collective preferences of the selected users, a collection of recommended items for the recommendation huddle, the request comprising identification information of the selected users;
  notify the recommendation service of the first user declining to join the recommendation huddle to cause the recommendation service to not access the first user's recommendation profile when generating recommendations;
  receive from the server implementing the recommendation service a collection of recommended items for the recommendation huddle;
  receive voting feedback from the second user devices, the voting feedback comprising votes that indicate user preferences for one or more of the recommended items;
  calculate a user influence of at least some of the users on the voting feedback based on correspondence between the votes of at least some of the users and the voting feedback;
  adjust the collection of recommended items based on the voting feedback and on the calculated user influence;
  automatically select one of the recommended items; and
  automatically cause the selected recommended item to be streamed to a multimedia device; and
 a user interface of the display of the first user device further configured to provide information related to the collection of recommended items and a visual indication based on the voting feedback to one or more of the selected users participating in the recommendation huddle.

2. The system of claim 1, wherein the recommendations module is further configured to transmit to the recommendation service information about the received voting feedback.

3. The system of claim 2, wherein
the recommendations module is further configured to receive from the recommendation service a second collection of recommended items for the recommendation huddle, wherein the second collection of recommended items is generated based at least in part on the transmitted information about the received voting feedback; and wherein
the user interface is further configured to provide to one or more users participating in the recommendation huddle information about the received second collection of recommended items for the recommendation huddle as said adjustment of the collection of recommended items.

4. A system comprising:
a first client device comprising one or more processors, said first client device programmed via executable code to:
automatically detect, without using a server as an intermediary, that second client devices are in proximity to the first client device based on wireless information received from the second client devices;
receive an indication that users of the detected second client devices would like to participate in a recommendation huddle;
present to a user associated with the first client device information about the recommendation huddle on a display of the first client device, wherein the information about the recommendation huddle comprises a selectable option to participate in the recommendation huddle, the selectable option displayed in a user interface on the display of the first client device;
receive from the user associated with the first client device an indication that the user would like to participate in the recommendation huddle;
transmit, to a computing device implementing a recommendation service, a request to obtain recommendations for the recommendation huddle;
receive from the recommendation service a collection of items recommended for the recommendation huddle, wherein the collection of items is generated based at least in part on item preference data associated with the recommendation huddle;
provide to the second client devices participating in the recommendation huddle information about the received collection of recommended items;
receive voting feedback from the user of the first client device and users of the second client devices, the voting feedback comprising votes that indicate a preference of the users for one or more of the recommended items;
calculate a user influence of at least some of the users on the voting feedback based on correspondence between the votes of at least some of the users and the voting feedback;
transmit the voting feedback and data representing the calculated user influence to the recommendation service;
receive from the recommendation service an adjusted collection of recommended items responsive to the voting feedback and on the calculated user influence;
receive a selection of an item of the adjusted collection of recommended items;
output data representing the adjusted collection of recommended items for presentation on a display of the first client device; and
automatically cause the selected recommended item to be streamed to a multimedia device.

5. The system of claim 4, wherein the item preference data associated with the recommendation huddle comprises item preference data of one or more users of the recommendation huddle.

6. The system of claim 4, wherein the item preference data associated with the recommendation huddle comprises past item selection activity of the recommendation huddle as a group.

7. The system of claim 4, said first client device further programmed to transmit to the recommendation service information about the received voting feedback.

8. The system of claim 4, said first client device further programmed to provide to one or more users participating in the recommendation huddle information about the adjusted collection of recommended items for the recommendation huddle.

9. A method of providing group recommendations, the method comprising:
automatically detecting, by a first device, that second devices are in proximity to the first device based on wireless information received from the second devices;
receiving, by the first device, information about a plurality of users of the second devices that would like to participate in a recommendation huddle;
receiving, by the first device, an indication of a first user associated with the first device that the first user would like to join the recommendation huddle;
transmitting, by the first device, a request to obtain recommendations for the recommendation huddle to a computing device implementing a recommendation service;
receiving, by the first device, a collection of items recommended for the recommendation huddle from the recommendation service, wherein the collection of items is generated based at least in part on item preference data associated with the recommendation huddle;
providing, by the first device, to the second devices participating in the recommendation huddle information about the received collection of recommended items;
receiving, by the first device, voting feedback transmitted from the second devices participating in the recommendation huddle, the voting feedback comprising votes that indicate user preferences for one or more of the recommended items;
calculating, by the first device, a user influence of at least some of the plurality of users on the voting feedback based on correspondence between the votes of at least some of the plurality of users and the voting feedback;
transmitting, by the first device, the voting feedback and data representing the calculated user influence to the recommendation service;
receiving, by the first device, an adjusted collection of recommended items responsive to the voting feedback and the calculated user influence from the recommendation service;
receiving, by the first device, a selection of an item of the adjusted collection of recommended items; and
automatically causing, by the first device, the selected recommended item to be streamed to a multimedia device, wherein the method is performed by one or more hardware processors.

10. The method of claim 9, wherein the item preference data associated with the recommendation huddle comprises item preference data of one or more users of the recommendation huddle.

11. The method of claim 9, further comprising providing, by the first device, to one or more users participating in the recommendation huddle information about the adjusted collection of recommended items for the recommendation huddle.

12. The method of claim 9, further comprising:
identifying, by the first device, a selected item from the collection of recommended items; and
receiving, by the first device, from a user participating in the recommendation huddle feedback on said selected item.

13. The method of claim 12, wherein said feedback on said selected item comprises a rating of the selected item.

14. A non-transitory physical computer storage having stored thereon executable instructions that, when implemented by a first device comprising a hardware processor, cause the first device to implement a method of providing group recommendations, said method comprising:
receiving an indication that one or more users would like to participate in a recommendation group;
automatically detecting, without using a server as an intermediary, information about the one or more users that would like to participate in the recommendation group, said automatically detecting comprising detecting that one or more second devices are in proximity to the first device, the one or more second devices operated by the one or more users;
in response to said detecting, transmitting to a server implementing a recommendation service over a network a request to programmatically generate, based at least in part on collective preferences of the one or more users participating in the recommendation group, a set of recommended items for the recommendation group;
receiving from the recommendation service a set of recommended items for the recommendation group;
providing to the one or more second devices of the one or more users participating in the recommendation group information related to the received set of recommended items for display on the one or more second devices;
receiving voting feedback from the one or more second devices, the voting feedback comprising one or more votes that indicate a preference of the one or more users for one or more of the recommended items;
calculating a user influence of at least some of the one or more users on the voting feedback based on correspondence between the votes of at least some of the one or more users and the voting feedback;
providing the voting feedback and data regarding the calculated user influence over the network to the recommendation service;
receiving over the network from the recommendation service an adjusted collection of recommended items responsive to the voting feedback and the calculated user influence;
displaying data representing the adjusted collection of recommended items on a display of the first device; and
receiving automatically-initiated digital streaming of a selected one of the recommended items.

15. The system of claim 1, wherein the recommendations module is further configured to calculate the user influence based at least partly on a frequency with which each of the users' voting feedback matched a winning vote of the recommendation huddle.

16. The system of claim 15, wherein the recommendations module is further configured to adjust the collection of recommended items based on the voting feedback and on the calculated user influence by at least targeting a second recommended item to one of the users whose voting feedback matched the winning vote of the recommendation huddle.

17. The system of claim 1, wherein the electronic acceptances comprise a digitally signed recommendation huddle invitation from a selected one of the second user devices, the digitally signed recommendation huddle invitation received directly by the first user device in response to the recommendation service being unavailable for communication with the selected one of the second user devices.

18. The system of claim 17, wherein the recommendation module is further configured to subsequently transmit the digitally signed recommendation huddle to the recommendation service to obtain verification of a digital signature associated with the digitally signed recommendation huddle invitation, so as to permit the selected second user device to participate in the recommendation huddle.

19. The system of claim 1, wherein the automatic detection of the second user devices comprises locating and identifying the second user devices that are in wireless range of the first user device.

20. The system of claim 1, wherein the user interface is further configured to:
present a user interface element configured to control the multimedia device for streaming the recommended item; and wherein the recommendation module is further configured to:
send, by the first user device through the user interface, a request to stream the recommended item to the multimedia device through the server.

21. The non-transitory physical computer storage of claim 14, wherein the method further comprises identifying, using a facial recognition technique, a user of a third user device, and in response to said identifying, adding the third user device to the recommendation group.

22. The non-transitory physical computer storage of claim 14, wherein the method further comprises tailoring a user interface comprising information regarding the recommended items to the users based on a location of one or more of the users; and outputting the user interface for presentation to one or more of the users.

* * * * *